Patented Dec. 14, 1937

2,102,327

UNITED STATES PATENT OFFICE 2,102,327

CERAMIC PATCHING CEMENT

John M. McKinley, East Cleveland, and Willard K. Carter, Columbus, Ohio, assignors to National Aluminate Corporation, Chicago, Ill., a corporation of Delaware No Drawing. Original application September 25, 1933, Serial No. 690,883. Divided and this application September 30, 1935, Serial No. 42,832

3 Claims. (Cl. 106—10)

This invention relates to an improved ceramic patching cement comprising clay and sodium aluminate.

This application is a division of the copending application of the present inventors, Serial No. 690,883, filed September 25, 1933, matured into Patent No. 2,019,618 granted November 5, 1935.

One of the objects of the invention is to produce a patching cement of superior quality by the use of argillaceous material such as clay, various fillers, and sodium aluminate.

This invention relates ultimately to the production of a unique and novel structure in clay ceramic ware, in silica ceramic ware, and in ware which may be composed essentially of clay and silica. This structure, which our invention produces in such wares, contributes novel and desired physical properties to these products and also contributes beneficial results in the nature of an enhancement of the desired physical properties normally possessed by such wares. In addition to the beneficial improvements resulting in the ultimate product, our invention also contributes beneficial results concerning all phases of the manufacturing process, the summation of which results, in the ultimate product, in the production of ware of increased quality, increased specific utility, and increased range of utility.

The process involved in bringing about these improvements consists essentially in the addition of a new and novel ingredient to ceramic mixtures such as are otherwise common and usual to this type of ceramic ware. This material, namely sodium aluminate, having the specified physical properties later enumerated, is mixed with the ceramic mass or mixture in suitable quantities and in such a manner as to be, for the purposes required, sufficiently therein disseminated. The method of admixture employed may be any which is suitable to the manufacturing process involved, and the quantity added will depend upon the physical properties of the ceramic mass or mixture involved. In the usual practice, the sodium aluminate addition will not comprise more than one-twentieth part of the total weight of the mixture, and in some practice the proportions of this addition may be greatly decreased, and in other practices the proportions of this addition may be greatly increased.

The following, however, composes an absolute essential of the specifications of our invention: The sodium aluminate must be in the form of a compound, fully and completely formed according to the specifications hereinafter given, before admixture with any of the ceramic mixtures or masses in which it is desired to obtain the unique and beneficial results which we have discovered and claim. We have found that in order to obtain these beneficial results there must be a joint and co-operating action of the elements of sodium aluminate, which can be obtained only by adding these elements in the form of the definitely specified compound. The addition of the separate elements of sodium aluminate, either by themselves or combined separately or together with other elements in natural or synthetic combinations, we have proved by long and exhaustive experimentation does not produce the novel and beneficial effects that are obtained by the addition of the hereinafter specified sodium aluminate.

We have further found that the several elementary parts of sodium aluminate act simultaneously to produce the improvements we have discovered, and continued action progresses from the initial introduction of the sodium aluminate to produce a succession of results, each contributing at some stage in the process to the improvements claimed and each of which is essential in a resulting completed product embodying the summation of improvements. We have found that the introduction of the separate constituents of sodium aluminate in other forms may or may not contribute in some degree to producing partial improvements at some stage in the processing, but the properties of the resulting finished product vary definitely from those properties produced by sodium aluminate used as such; and that no other compound or compounds comprised of the separate elements of sodium aluminate, and no other compound and either or any of the separate elements of sodium aluminate, can be introduced into a ceramic mixture or mass such as we are concerned with and result in producing all of the novel and beneficial effects which are produced by sodium aluminate throughout the process of manufacturing or attain the summation of improvements resulting from the introduction of sodium aluminate.

Hence, specifically, our invention consists of the addition of sodium aluminate to ceramic mixtures comprised of clay, silica, or clay and silica, and commonly associated ingredients, it being an essential of this invention that the sodium aluminate addition be made in such a manner and in such quantity as to produce thorough mixture and dissemination throughout the ceramic mass or mixture and to produce, to the desired degree, the peculiar structure resulting from sodium aluminate additions to such ceramic mixtures or masses, and that the sodium aluminate comprising such addition shall have the following specified physical properties: It should consist essentially of pure sodium meta-aluminate, $Na_2Al_2O_4$, containing but a slight excess of sodium hydroxide or sodium carbonate. It should be completely or nearly completely soluble in water.

We have found that as a result of the addition of such specified sodium aluminate, our process fully develops the following effects which have been found to be in themselves unique, novel and of great utility, and to contribute, in part or whole, either severally or in combination, to an ultimate product, unique, novel, and of great utility.

The use of the sodium aluminate produces controlled coalescence of related grain particles, resulting from a seeming plastic flow produced by the addition of sodium aluminate. It diminishes the common or usual shrinkage strains, increases the green strength of all wares concerned without lowering the fusion range of the finished fired articles. It permits increase in grain size of aggregate without corresponding increase in porosity and permits a decrease of porosity of the fired cement without altering the normal grain size. It produces higher ultimate fusion value as expressed in pyrometric cone equivalents and particularly overcomes undesired firing shrinkage.

As an exemplification of the present invention, the following two batches of material were made up, the first of these being made in accordance with the present invention and the second batch constituting a standard of comparison so that the advantages of the present invention may be more readily understood.

The batch made in accordance with the present invention was as follows:

| | Percent |
|---|---|
| Kentucky grog | 70 |
| Kentucky semi-hard clay | 20 |
| Kentucky plastic clay | 10 |

This constituted 100%, or 100 parts, to which there were added one part of sodium aluminate of the type hereinabove indicated. From 11 to 13 parts of water were mixed with this material in order to produce a plastic patching cement ready for application and drying and firing within a furnace.

The comparative batch consisted of the identical materials and identical proportions except that the sodium aluminate was omitted.

In order to demonstrate the difference between the material made in accordance with the invention—that is, the one containing sodium aluminate—and the batch made without practicing the present invention, the cement thus made was formed into test bars which were dried and fired. Pyrometric cones were likewise prepared and tested. The most outstanding differences were found in the firing shrinkage at the range between 2660° F. and 2840° F. The sample containing the sodium aluminate as well as that devoid of sodium aluminate showed about the same shrinkage in the firing range between 1600° F. and 2660° F., but after the firing had been continued to 2840° F. the total shrinkage, which at 2660° F. had been as much as 2½%, had diminished in the case of the sample containing the sodium aluminate because of an intervening expansion amounting to 0.5% which then took place. At the temperature of 2840° F. the sample devoid of sodium aluminate still showed a shrinkage of 2.5% and even when eventually fired at 3100° F. still showed a shrinkage of 1.7%. This expansion between 2660° and 2840° F. can be explained by the formation of a very definite type of glass phase from the sodium aluminate, probably by its interaction with constituents of the clay, and that this phase by filling up the pores between the particles of the ceramic refractory mass prevents its shrinking any further, and by its own expansion practically equalizes the previous contraction so that the final shrinkage is only 0.5%. This is a great advantage and an entirely unexpected and valuable result.

The pyrometric cones made from the same batches of material compared as follows: The sample containing the sodium aluminate had a pyrometric cone equivalent of 32.5 while that devoid of sodium aluminate had a pyrometric cone equivalent of only 31.5 to 32. This therefore shows an increase in pyrometric cone equivalence of from one-half to one cone merely by the addition of the sodium aluminate.

The present invention is particularly directed to the making of patching cements to be used in high-temperature furnaces where resistance to spalling is important and where shrinkage cracks are not desired. It has been found that the use of the formula hereinabove expressed, and reasonable modifications thereof, yields a patching cement which has such a small shrinkage factor that cracks are virtually eliminated during use.

There are no special precautions which have to be exercised in using the cement, it being applied in the normal manner with which the workers in this art are fully conversant.

We claim:

1. A refractory patching cement comprising grog, clay, and about 1% of sodium aluminate.

2. A refractory patching cement comprising grog, a mixture of some hard and plastic clays, and about 1% of sodium aluminate.

3. A refractory patching cement comprising about 70 parts of grog, about 20 parts of some hard clay, about 10 parts of plastic clay, and about 1 part of sodium aluminate.

JOHN M. McKINLEY.
WILLARD K. CARTER.